J. M. CRATER.
BED PAN.
APPLICATION FILED OCT. 23, 1908.
926,103.
Patented June 29, 1909.
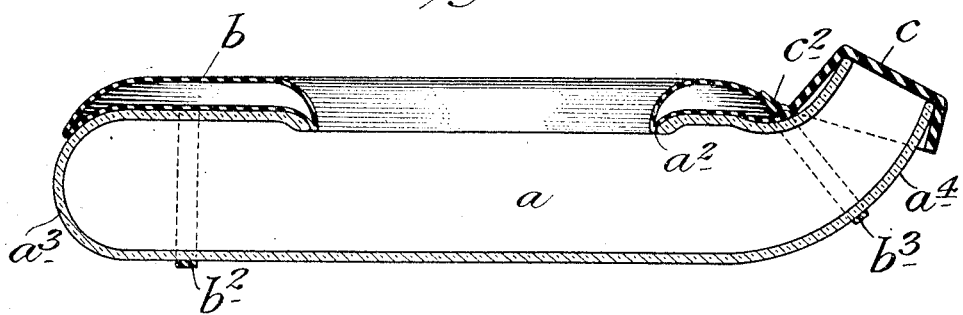
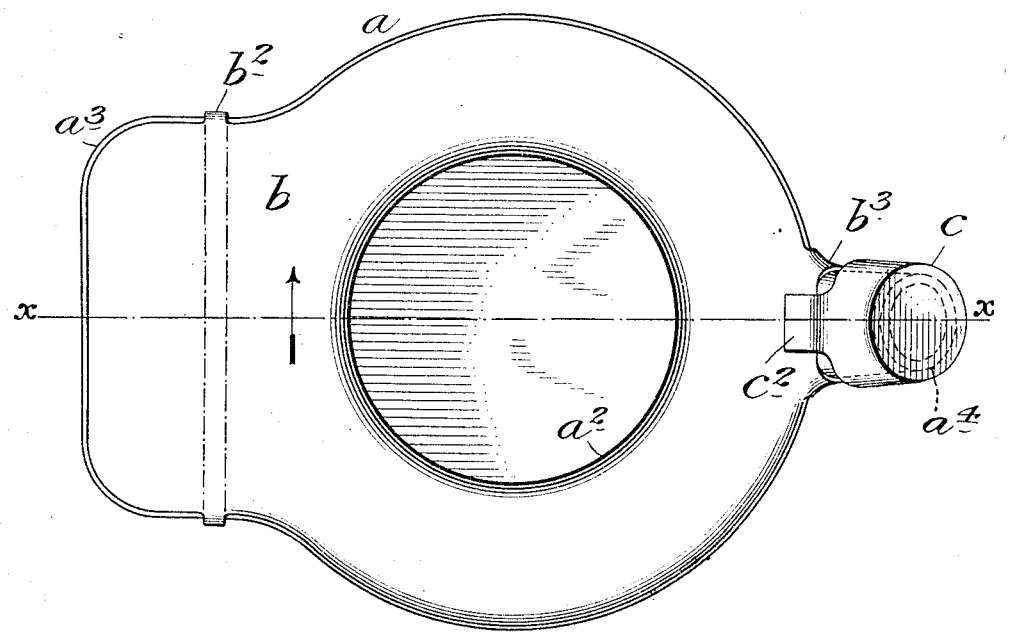
WITNESSES
A. R. Appleman
C. E. Mulreany
INVENTOR,
Jane M. Crater;
BY Edgar Tate
ATTORNEYS.

UNITED STATES PATENT OFFICE.

JANE M. CRATER, OF NEW GERMANTOWN, NEW JERSEY.

BED-PAN.

No. 926,103.     Specification of Letters Patent.     Patented June 29, 1909.

Application filed October 23, 1908. Serial No. 459,160.

*To all whom it may concern:*

Be it known that I, JANE M. CRATER, a citizen of the United States, and residing at New Germantown, in the county of Hunterdon and State of New Jersey, have invented certain new and useful Improvements in Bed-Pans, of which the following is a specification, such as will enable those skilled in the art to which it appertains to make and use the same.

This invention relates to bed pans for use by invalids, and the object thereof is to provide a pan of this class which is provided with means for preventing the said pan from chilling a patient when in use and also to provide a soft bearing surface for the said pan.

The invention is fully disclosed in the following specification, of which the accompanying drawing forms a part, in which the separate parts of my improvement are designated by suitable reference characters in each of the views, and in which:—

Figure 1 is a central vertical longitudinal section of my improved bed pan on the line $x$—$x$ of Fig. 2, and;—Fig. 2 a plan view of said pan.

In the accompanying drawing I have shown at $a$ a pan of the usual form, the body portion of said pan being substantially circular in form and being provided with a large central top opening $a^2$, and with a back extension $a^3$, and a front upwardly directed neck or spout $a^4$, and in the practice of my invention, I place on the pan $a$ a sealed annular cushion $b$ of rubber, rubber and canvas, or any other suitable material, said cushion being so formed as to closely fit and cover the entire top portion of the pan around the central opening $a^2$ therein. The cushion $b$ is provided with a strap $b^2$ adapted to be passed around the rear extension $a^3$ of the pan and with a strap $b^3$ adapted to be passed around the neck portion $a^4$ of the pan so as to hold said cushion in place. I also provide a cap $c$ for the neck $a^4$ of the pan, said cap being also composed of ruber, rubber and canvas, or other suitable material, and this cap is provided with a lip $c^2$ by which it is secured to the adjacent part of the cushion $b$.

Constructed as shown and described, it will be seen, that the cushion $b$ will prevent the pan from coming in contact when in use with the patient. Pans of this class are usually made of porcelain, but are sometimes made of sheet metal, and in either event they are always cold unless previously heated, and when placed in position for use they chill the patient. With my improvement, however, the cushion $b$ not only operates to prevent this result, but also prevents the patient from being bruised or injured by the pan when in use.

Having fully described my invention, what I claim as new and desire to secure by Letters Patent, is:—

A bed pan provided at the front side thereof with a discharge neck which is directed upwardly, said pan being also provided in the top thereof with a large central opening, and an annular cushion adapted to be placed on the pan over the body thereof and provided with an opening which corresponds with that in the top of the pan, said cushion being also provided with a cap which is flexibly connected therewith and adapted to close said neck, and means for securing said cushion to said pan.

In testimony that I claim the foregoing as my invention I have signed my name in presence of the subscribing witnesses this twentieth day of October 1908.

JANE M. CRATER.

Witnesses:
M. R. COOK,
HELEN R. COOK.